No. 849,787. PATENTED APR. 9, 1907.
G. HITZ.
PROCESS OF GROWING SWEET POTATOES AND OTHER TUBERS.
APPLICATION FILED DEC. 6, 1906.
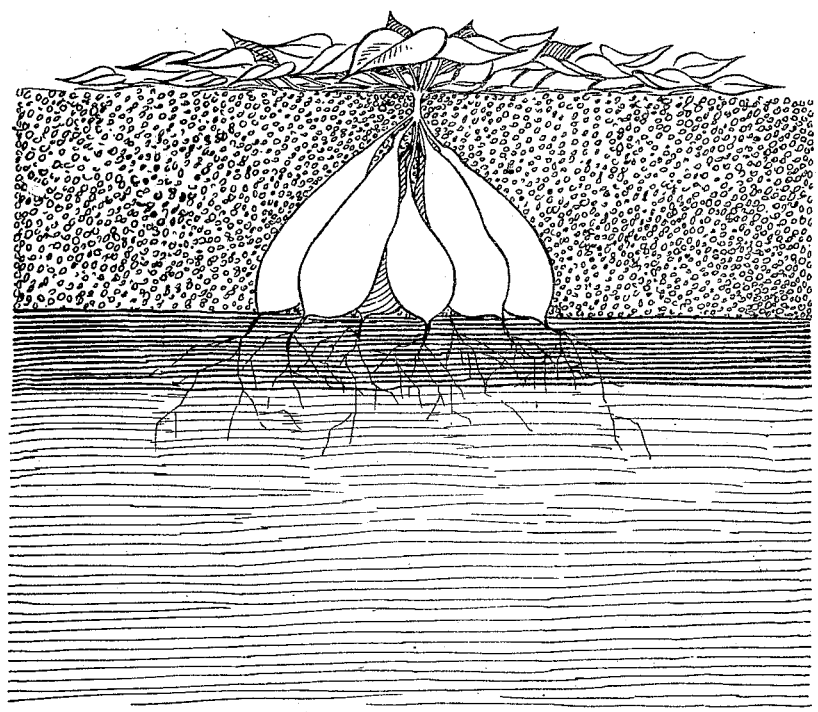
WITNESSES:
W. M. Gentte
N. Allemong
INVENTOR.
George Hitz.
BY
ATTORNEY.

UNITED STATES PATENT OFFICE.

GEORGE HITZ, OF INDIANAPOLIS, INDIANA.

PROCESS OF GROWING SWEET POTATOES AND OTHER TUBERS.

No. 849,787.        Specification of Letters Patent.        Patented April 9, 1907.

Application filed December 6, 1906. Serial No. 346,652.

*To all whom it may concern:*

Be it known that I, GEORGE HITZ, of Indianapolis, county of Marion, and State of Indiana, have invented a certain new and useful Process of Growing Sweet Potatoes and other Tubers; and I do hereby declare that the following is a full, clear, and exact description thereof, reference being had to the accompanying drawings, in which like letters refer to like parts.

The object of this invention is to grow sweet potatoes and other tubers in a manner that will, first, greatly increase their yield; second, improve the quality; third, obtain a rich and uniform color; fourth, render the tubers smooth, clean, and of uniform size, and, fifth, enhance their keeping qualities.

While the method of growing sweet potatoes is shown and described herein, still I do not wish the invention to be limited to sweet potatoes, as the principle is applicable to the raising of other tubers, such as Irish potatoes, peanuts, and the like.

The nature of the invention will be understood from the accompanying drawing and the following description and claims.

The drawing is a vertical section through soil prepared for growing sweet potatoes with one hill of sweet potatoes shown in vertical section.

In carrying out the process specifically for growing sweet potatoes, as I have heretofore done, I take a piece of ground having a rich black loam soil and that is unplowed or reasonably hard and harrow it both ways, so that it will be loosened up on the surface for about two inches deep. It need not be plowed up or treated otherwise than scratched on the surface by a harrow or like implement. Upon this I deposit and distribute yellow sand to a depth of about ten inches. It need not be absolutely pure sand, but may be mixed slightly with soil or loam. The surface of the sand is preferably left level, and in it the sweet-potato plants are planted.

No further treatment of the soil or sand is necessary in growing a crop of sweet potatoes, nor is any further treatment of the sand or soil necessary in growing crops in subsequent years. A union is effected between the scratched surface of the hard soil and the sand. No further treatment of the hard soil is necessary, because that union will be maintained by the superimposed sand. If in subsequent years the surface of the sand becomes hardened somewhat or weedy, it should be treated to avoid these difficulties. This renders the potatoes grown in this manner extremely cheap and economical after the ground has once been prepared.

After the potato-plants have been planted in the manner described in ground prepared as described the roots will grow down through the sand until they strike the hard ground or soil, and there the potatoes will be formed in the sand immediately above the hard soil. The hardness of the soil prevents their formation in it; but the scratched surface of the soil permits the roots and the fibers at the end of the forming potatoes to enter the soil and gain nourishment from it. The result will be that all of the potatoes will be formed in the sand just above the hard soil, and they will all spread and develop at the same place—just above the hard soil—and therefore they turn out to be substantially of the same size, as they are all grown under substantially the same condition. They do not grow overlarge, because some cannot get more nourishment than others or some form in the black soil more than others; nor will there be any too small, as they will all gain substantially the same nourishment and expand in substantially the same quality of sand. Experience has shown that potatoes of uniform size are thus produced, and that renders them very desirable for marketing purposes, as variations in the sizes of potatoes requires sorting and otherwise causes trouble for the commission merchant.

Another result is that the potatoes will all have a surface that is smooth and clean and of a rich golden yellow, as they form in loose sand of a yellow color. These qualities contribute greatly to the salability of the potatoes. I have also found that it enhances the keeping quality of the potato as compared with potatoes grown in the usual ways and that the potato is of a superior quality in texture and character, it being dry and sweet, because it is grown in dry sand and gets nourishment from the subsoil; but the greatest advantage arising from my process is the increase in yield, as from my experience the yield of potatoes grown in the manner herein set forth is very much greater than when grown in the ordinary manner. This is because everything is favorable to the potato and because of the peculiar combination of the sand and subsoil.

While I have above given the details of the manner of raising sweet potatoes as I have carried out my invention, still I do not wish to be limited to some of the details. It is not necessary that the soil should be rich black loam, as any soil which will nourish potatoes will do, although rich black loam will be best; nor do I wish to be limited to yellow sand. The color of the sand should be preferably the same as the desired color of the tuber. For instance, in growing Irish potatoes or peanuts a white sand would be preferable.

What I claim as my invention, and desire to secure by Letters Patent, is—

1. The process of growing sweet potatoes and other tubers, which process consists in first selecting a hard unplowed soil; second, covering it with sand, and third, planting the tubers in the upper part or sand, whereby the roots of the tubers will penetrate the soil and the tubers will form in the sand and a little above the subsoil.

2. The process of growing sweet potatoes and other tubers, which process consists first in taking hard ground and loosening up the surface thereof by a harrow or the like implement, so the loosened ground will be very shallow with a hard bottom covering the same with sand to the desired depth whereby a union will be effected between the soil and the sand, and third, planting tubers in the upper part of the sand whereby the roots will penetrate the loosened surfaces of the soil and the tubers form in the sand immediately above the subsoil.

In witness whereof I have hereunto affixed my signature in the presence of the witnesses herein named.

GEORGE HITZ.

Witnesses:
 N. ALLEMONG,
 H. B. McCORD.